(12) United States Patent
Lee

(10) Patent No.: US 11,216,996 B2
(45) Date of Patent: Jan. 4, 2022

(54) SYSTEM FOR GENERATING ELECTRONIC OPTION CHART AND METHOD THEREOF

(71) Applicant: Jin Hoon Lee, Incheon (KR)

(72) Inventor: Jin Hoon Lee, Incheon (KR)

( * ) Notice: Subject to any disclaimer, the term of this patent is extended or adjusted under 35 U.S.C. 154(b) by 0 days.

(21) Appl. No.: 16/799,037

(22) Filed: Feb. 24, 2020

(65) Prior Publication Data
US 2020/0193660 A1    Jun. 18, 2020

Related U.S. Application Data

(63) Continuation of application No. PCT/KR2018/008940, filed on Aug. 7, 2018.

(30) Foreign Application Priority Data

Aug. 23, 2017  (KR) .................. 10-2017-0106455

(51) Int. Cl.
    G06T 11/20    (2006.01)
    G06Q 40/06    (2012.01)
(52) U.S. Cl.
    CPC ............ G06T 11/206 (2013.01); G06Q 40/06 (2013.01)
(58) Field of Classification Search
    CPC .......................... G06T 11/206; G06Q 40/06
    See application file for complete search history.

(56) References Cited

U.S. PATENT DOCUMENTS

| 7,356,501 | B2 | 4/2008 | Churquina | |
| 2008/0270322 | A1* | 10/2008 | Cooper | G06Q 40/06 705/36 R |
| 2011/0282802 | A1* | 11/2011 | Mak | G06Q 40/06 705/36 R |
| 2014/0279345 | A1 | 9/2014 | Burns et al. | |

FOREIGN PATENT DOCUMENTS

| JP | 2004-519753 | 7/2004 |
| KR | 10-2004-0010036 | 1/2004 |
| KR | 10-0919210 | 9/2009 |
| KR | 20-2013-0006309 | 11/2013 |
| WO | 2002/017120 | 2/2002 |

OTHER PUBLICATIONS

International Search Report dated Dec. 11, 2018, in international Application No. PCT/KR2018/008940 (with English Translation).
https://blog.naver.com/elwels/125496934, dated Apr. 4, 2011, 2 pages (with English Translation).

* cited by examiner

*Primary Examiner* — Chong Wu
(74) *Attorney, Agent, or Firm* — H.C. Park & Associates, PLC

(57) ABSTRACT

A system and method for generating an electronic option chart includes an interface module to receive option information including information on a call option and a put option having a plurality of strike prices and a control module to generate the electronic option chart on the basis of the received option information, wherein the control module sets a predetermined first position of a first axis as a position of a call option and a predetermined second position of the first axis as position of a put option and sets the second axis as an axis representing a price, generates signals to display price information of each of a plurality of call option products having different strike prices at the first position of the first axis, and displays price information of each of a plurality of put option products having different strike prices at the second position of the first axis.

15 Claims, 3 Drawing Sheets

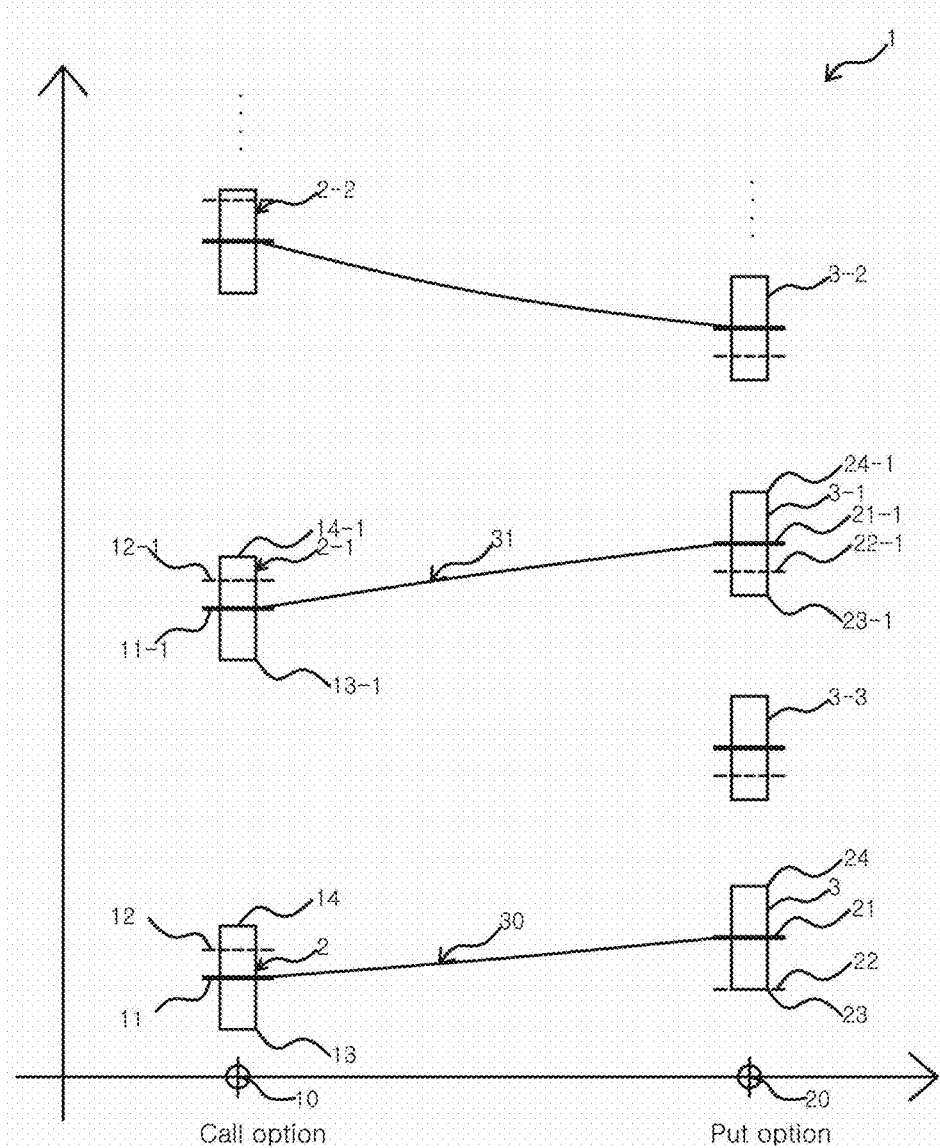

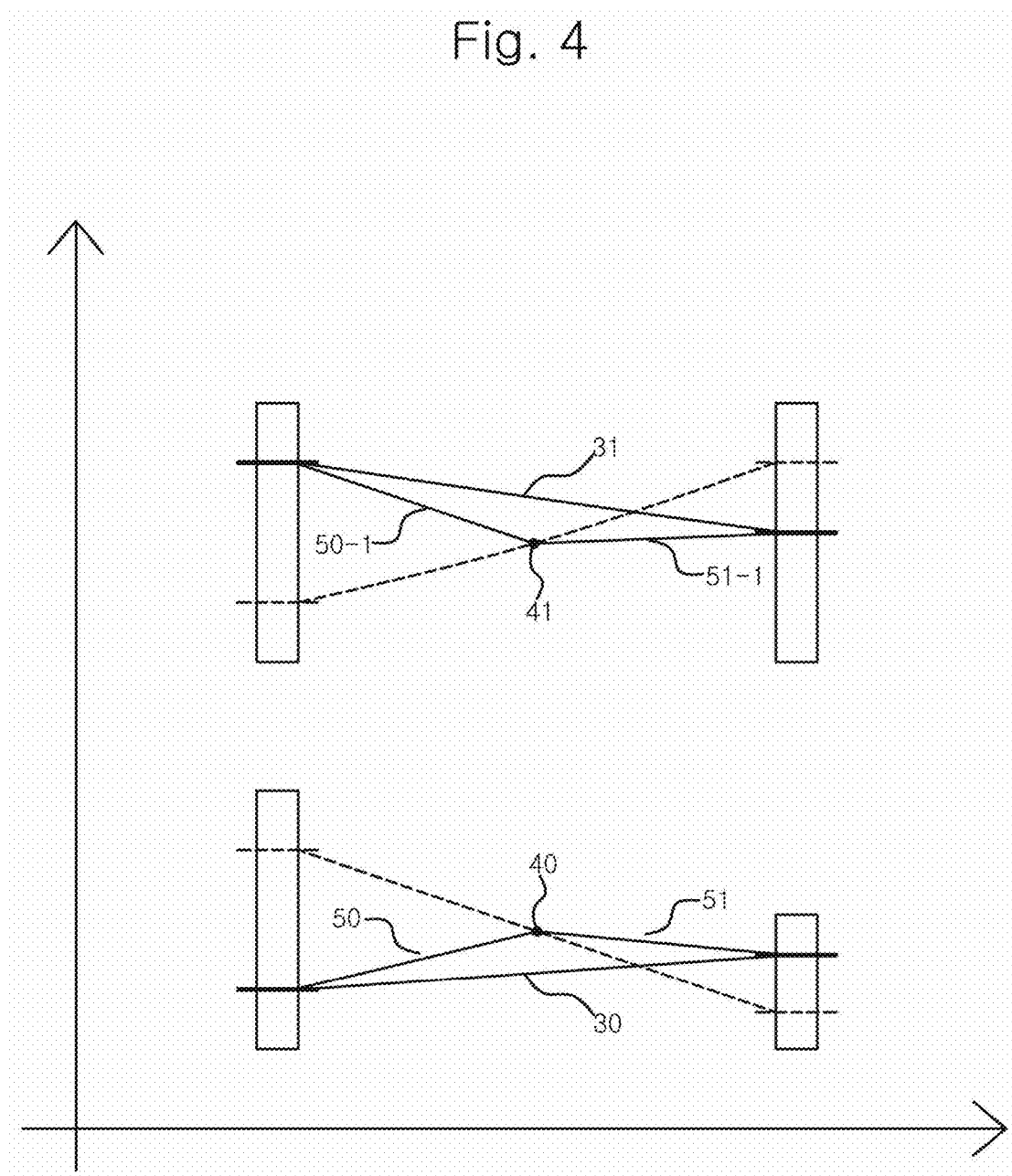

SYSTEM FOR GENERATING ELECTRONIC OPTION CHART AND METHOD THEREOF

CROSS-REFERENCE TO RELATED APPLICATIONS

This application is a Bypass Continuation of International Patent Application No. PCT/KR2018/008940, filed on Aug. 7, 2018, and claims priority from and the benefit of Korean Patent Application No. 10-2017-0106455, filed on Aug. 23, 2017, which is hereby incorporated by reference for all purposes as if fully set forth herein.

BACKGROUND

Field

Exemplary implementations of the invention relate generally to electronic option charts, and more specifically, to electronic systems and methods to generate electronic option charts.

Option products (Options) are in the spotlight of investors in that the investors can make a relatively more substantial leveraged investment.

As used herein, the option products can be defined to include financial products of all kinds that have a call option and a put option regardless of kinds of underlying assets, such as stock options, stock index options, currency options, futures options, product options, and so on.

FIG. 1 illustrates an example of an electronic chart or other tools for the investment of such option products, and shows the user interface of a conventional electronic option quotation board.

Referring to FIG. 1, the conventional electronic option quotation board provides option information of various kinds including price information of a current price, an opening price, a low price, and a high price of a plurality of option products, such as a call option and a put option product, with different strike prices.

Investors decide whether to invest, when to invest, what kind of investments, and etc. by utilizing information shown on the electric option board.

However, such an electric option board shows just an enumeration of information and cannot help people grasp the unique characteristics of the option products intuitively.

For instance, the call option and the put option, which are at the opposite position to each other, exist at the same time. That is, due to the nature of options, there exist opposite positions. Moreover, the price of the call option and the price of the put option may influence each other mutually.

That is, there are checks between the price of the call option and the price of the put option and breakthrough or collision at a specific point between the price of the call option and the price of the put option. Additionally, a rise in price of one among the call option and the put option generally causes a drop in price of the other one, but they do not always make a linear movement ideally. However, in all circumstances, the prices of products at the opposite position have an influence on the price of the corresponding position. For instance, with respect to a specific call option product, the price of any one among put option products, which are at the opposite positions, may play a support role or a resistance role. Alternatively, the range of fluctuation at the opposite position may have an influence on prediction of the range of fluctuation at the corresponding position.

The above information disclosed in this Background section is only for understanding of the background of the inventive concepts, and, therefore, it may contain information that does not constitute prior art.

SUMMARY

Applicant discovered that, while the conventional electronic option board or chart for option investors can provide correct information of various kinds, it is not suitable for grasping influences, such as checks, crosses, and so on, in price fluctuations of option products at the opposite position Electronic option chart systems and methods constructed according to the principles and exemplary implementations of the invention are capable of generating an electronic option chart that easily compares prices of two option products in opposite positions and predicts a trend in the price of option products. For example, the electronic option chart may provide insightful data on the influence of the price of products in opposite positions, such as checks, crosses, breakthrough or collision points between the price of the call option and the price of the put option.

More specifically, systems and methods for generating an electronic option chart according to the principles and exemplary implementations of the invention allow investors to intuitively grasp a rise, a drop and a ratio of premium of option prices by indicating at a corresponding position to facilitate comparison of price values, such as opening prices, high prices, low prices, and a closing price (current price), which are opposite to each other by strike prices (within a specified range).

Therefore, systems and methods for generating an electronic option chart according to exemplary embodiments of the invention allow investors to easily grasp timing for option trading including straddle and strangle which are the basics for strategic trading, not to mention bidding or asking.

Furthermore, systems and methods for generating an electronic option chart according to exemplary embodiments of the invention allow investors to intuitively and easily grasp a flow (a triangular form and angle) of option prices, which are frequently distorted at an inflection point of the trend, through a triangle chart.

Additional features of the inventive concepts will be set forth in the description which follows, and in part will be apparent from the description, or may be learned by practice of the inventive concepts.

According to one aspect of the invention, a system for generating an electronic option chart includes an interface module to receive option information including information on a call option and a put option having a plurality of strike prices, and a control module to generate the electronic option chart on the basis of the received option information, wherein the control module sets a predetermined first position of a first axis as a position of a call option and a predetermined second position of the first axis as position of a put option and sets the second axis as an axis representing a price, generates signals to display price information of each of a plurality of call option products having different strike prices at the first position of the first axis, and displays price information of each of a plurality of put option products having different strike prices at the second position of the first axis.

The control module may be configured to determine at least one second position option product, each of which has an opposite position and closest opening price to at least one first position option product, as a corresponding option product corresponding to the at least one first position option product of a plurality of a first position option products which are one of the call option products or the put option products.

The control module may be configured to generate predetermined connection information for display between the determined corresponding option products.

The control module may be configured to indicate some first position option products, each of which has a specified price within a predetermined price range, on the electronic option chart.

The control module may be configured to determine the corresponding option product on the basis of a criterion option product, which is one of the call option products or the put option products, a number of which with strike price within the predetermined price range is smaller.

The connection information may include a current-call-put connection line to connect current prices of the corresponding option products with each other.

The control module may be configured to generate signals to display a triangle chart having plural opening-middle-current connection lines each of which connects each current price of the corresponding option products and an opening middle point which is a middle point of the connection line that connects the opening price of the corresponding option products, and the current-call-put connection line.

The price information may include information on current price, opening price, high price and low price of the option products.

According to another aspect of the invention, a method for generating an electronic option chart includes the steps of receiving option information including information on a call option and a put option having a plurality of strike prices, and generating an electronic option chart based on the received option information by setting a first position of a first axis as a call option position and a second position of the first axis as a put option position and setting a second axis as an axis to prices, and generating signals to display price information of each of a plurality of call option products having different strike prices at the first position of the first axis, and generating signals to display price information of each of a plurality of put option products having different strike prices at the second position of the first axis.

The step of generating an electronic option chart based on the received option information may further include the steps of determining at least one second position option product, each of which has opposite position and closest opening price to at least one first position option product, as a corresponding option product corresponding to the at least one first position option product of a plurality of a first position option products which are one of the call option products or the put option products.

The step of generating an electronic option chart based on the received option information may further include the steps of generating signals to display predetermined connection information between the determined corresponding option products.

The connection information may include a current-call-put connection line that connects current prices of the corresponding option products with each other, and the step of generating an electronic option chart based on the received option information may further include the steps of generating signals to display a triangle chart having plural opening-middle-current connection lines each of which connects each current price of the corresponding option products and an opening middle point which is a middle point of the connection line that connects the opening price of the corresponding option products, and the current-call-put connection line.

According to another aspect of the invention, a computer program stored in a recording media configured to be installed in a data processor has instructions to carry out the steps of receiving option information including information on a call option and a put option having a plurality of strike prices, and generating an electronic option chart based on the received option information by setting a first position of a first axis as a call option position and a second position of the first axis as a put option position and setting a second axis as an axis to prices, and generating signals to display price information of each of a plurality of call option products having different strike prices at the first position of the first axis, and generating signals to display price information of each of a plurality of put option products having different strike prices at the second position of the first axis.

The computer program stored in a recording media configured to be installed in a data processor may further include instructions to generate an electronic option chart based on the received option information by determining at least one second position option product, each of which has opposite position and closest opening price to at least one first position option product, as a corresponding option product corresponding to the at least one first position option product of a plurality of a first position option products which are one of the call option products or the put option products, generating signals to display predetermined connection information between the determined corresponding option products, where the connection information may include a current-call-put connection line that connects current prices of the corresponding option products with each other, and generating signals to display a triangle chart having plural opening-middle-current connection lines each of which connects each current price of the corresponding option products and an opening middle point which is a middle point of the connection line that connects the opening price of the corresponding option products, and the current-call-put connection line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 3 is a diagram of an exemplary embodiment of an electronic option chart constructed according to the principles of the invention.

FIG. 4 is a diagram of an exemplary embodiment of a triangle chart constructed according to the principles of the invention.

DETAILED DESCRIPTION

Figures 1, 2:
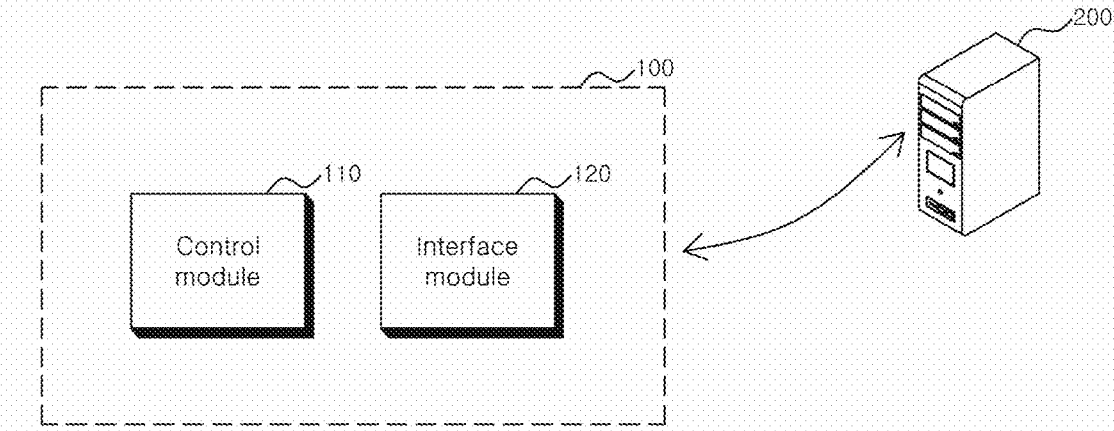
FIG. 1 illustrates an exemplary embodiment of the user interface of a conventional electronic option quotation board.
FIG. 2 is a schematic diagram of an exemplary embodiment of a system for generating an electronic option chart constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

The systems and methods for generating an electronic option chart according to exemplary embodiments or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the systems and methods for generating an electronic option chart according to the exemplary embodiments or one or more components thereof, may include or otherwise be associated with one or more memories (not shown) including code (e.g., instructions) configured to cause the system or components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Moreover, as used herein if any one component "transfers" data to another component, it means that the one component may directly transfer the data to the other component or may transfer the data to the other component indirectly through at least another component.

On the other hand, if any one component "directly transfers" data to another component, it means that the one component transfers the data to the another component without going through another component.

Hereinafter, exemplary embodiments of the invention will now be described in detail with reference to the attached drawings. In the drawings, similar parts are denoted by similar reference numerals.

FIG. 2 is a schematic diagram of an exemplary embodiment of a system for generating an electronic option chart constructed according to the principles of the invention.

Referring to FIG. 2, in order to implement a method for generating an electronic option chart according to the principles of the invention, an electronic option chart generating system 100 may be disposed.

The electronic option chart generating system 100 may be embodied by a combination of software for implementing embodiments of the invention and hardware for running the software.

For instance, a user may install software for implementing exemplary embodiments of the invention to a data processor. Then, the software runs the data processing apparatus to implement exemplary embodiments of the invention.

The electronic option chart generating system 100 can communicate with an exterior system 200. The electronic option chart generating system 100 can implement exemplary embodiments of the invention while communicating with the exterior system 200.

For example, the exterior system 200 can transfer information of options to the electronic option chart generating system 100. Then, the electronic option chart generating system 100 creates an electronic option chart according to exemplary embodiments of the invention, which will be described later, on the basis of option information, and provides the information to the data processing apparatus. The user can implement exemplary embodiments of the invention using the electronic option chart provided to the data processing apparatus.

The electronic option chart generating system 100 may be an independent application or software additionally installed to a predetermined application or program. For instance, software of the electronic option chart generating system 100 is additionally installed to a conventional home trading system (HTS) or a conventional mobile trading system (MTS) in order to send and receive necessary information to and from the HTS or the MTS. Therefore, the electronic option chart generating system can implement exemplary embodiments of the invention. In this instance, the software may be an add-on program of the HTS or the MTS or program capable of carrying out communication through a predetermined API.

Furthermore, the exterior system 200 may be a server for the HTS or the MTS or may be the HTS or the MTS itself.

Those skilled in the art can deduce easily that the electronic option chart generating system 100 can be embodied in other various ways and the exterior system 200 also can be embodied by any system that is capable of providing option information to the electronic option chart generating system 100, for instance, option market systems, portal sites, stock firm systems, and so on.

Additionally, if necessary, the electronic option chart generating system 100 may be linked with an ordering system in order to output an order using the electronic option chart according to principles of the invention.

The electronic option chart generating system 100 analyzes the characteristics of the electronic option chart according to the principles of the invention and transmits an order signal to an ordering system for ordering options, thereby automatically performing a trading system. It may also be used for trading platforms. For example, by providing investors with an electronic option chart according to exemplary embodiments of the invention, it is possible to provide investors with the investment information necessary for the option more intuitively.

In addition, the control module 110 automatically detects the shape and/or area of the triangular chart as will be described later, and may use the identified information as an important signal for trading used in a trading system or a trading platform.

In this exemplary embodiment, a module means a functional and structural combination of hardware for carrying out the principles of the invention and software to run the hardware. For instance, the module may mean a logical unit of a predetermined code and a hardware resource for carrying out the code. Those skilled in the art can deduce easily that the module does not mean a code connected essentially physically or does not mean hardware of one kind. Therefore, the module means combination between hardware and software for carrying out the functions defined in this invention and not means a specifically physical structure.

In addition, the electronic option chart generating system 100 may mean a logical structure having hardware resources and/or software necessary for implementing exemplary embodiments of the invention, but does not mean one physical structure element or one device. That is, the electronic option chart generating system 100 may mean a logical combination of hardware and/or software disposed to embody exemplary embodiments of the invention, and if necessary, may be mounted on devices separated from each other to carry out their own functions so as to form a group of logical components to implement exemplary embodiments of the invention. Moreover, the electronic option chart generating system 100 may mean a group of components which are embodied by functions or roles to implement exemplary embodiments of the invention.

For instance, a control module 110 and an interface module 120 may be respectively located at different physical devices, or may be located at the same physical device. Additionally, the combination of the software and/or the hardware for respectively forming the control module 110 and the interface module 120 may be located at different physical devices, or the components located at the different physical devices may be organically combined with each other to respectively embody the modules.

The control module 110 may control functions and/or resources of other components, for instance, the interface module 120 or the data processor included in the electronic option chart generating system 100 in order to control functions and/or resources of the hardware necessary for implementing exemplary embodiments of the invention, for instance, a communication device, a display device, and so on.

The interface module 120 communicates with the exterior system 200 in order to send and receive information necessary for implementing exemplary embodiments of the invention. Moreover, the interface module 120 provides a predetermined user interface to the electronic option chart generated according to exemplary embodiments of the invention if necessary, so as to promptly output an order to the ordering system, for instance, an order brokering system of a stock firm, or an option market system for dealing with options.

The interface module 120 can receive option information from the exterior system 200.

The option information may include information on a call option and a put option corresponding to a plurality of strike prices and the relevant strike price. The information on the call option (put option) may include price information on various prices, such as an opening price, a high price, a low price, a current price, and so on.

Furthermore, as shown in FIG. 1, the information on the call option (put option) may include various indexes or numerical values widely used by investors for investing option products, such as a fluctuation rate, comparing to, delta, unsettlement, and so on.

Then, the control module 110 can receive the option information through the interface module 120, and create an electronic option chart according to exemplary embodiments of the invention on the basis of the received information.

According to exemplary embodiments of the invention, the control module 110 can create the electronic option chart for intuitively and easily grasping prices of the option positions of the opposite positions.

Therefore, the electronic option chart for creating the control module 110 has a first position at which information of call option products is displayed and a second position at which information of put option products is displayed at a first axis.

Additionally, information on a plurality of different call option products, especially price information, having different strike prices may be displayed at the first position.

In addition, information on a plurality of different put option products, especially price information, having different strike prices may be displayed at the first position.

Moreover, a second axis may be used as an axis for indicating prices.

Referring to FIG. 3, some exemplary embodiments of the invention will be described in more detail.

FIG. 3 is a diagram of an exemplary embodiment of an electronic option chart constructed according to the principles of the invention.

Referring to FIG. 3, the electronic option chart 1 according to exemplary embodiments of the invention may create a chart using the first axis, for instance, an X-axis, and the second axis, for instance, a Y-axis, as shown in the drawing. Of course, the first axis may be the Y-axis, and in this instance, the chart is a simple modification that the chart is rotated. Therefore, in this embodiment, for convenience of description, an example that the first axis is the X-axis will be described. However, the exemplary embodiments are not limited to the above.

As described above, the first axis, for instance, the X-axis, is an axis to indicate option products, and the information of call option products is displayed at the first position 10, and information of put option products is displayed at the second position 20. Of course, information of the put option products may be displayed at the first position 10 to exchange the positions with each other.

In this embodiment, whether the option products are displayed at the first position or at the second position does not mean that the option products are exactly displayed on the exact coordinates of the first position or the second position, and it is natural that the positions may be changed if necessary. Therefore, those skilled in the art may easily deduce that the information of the option products is displayed on the same coordinate corresponding to the first position or the second position or on the substantially the same coordinate corresponding to the first position or the second position.

As shown in the drawing, information on the call option products with different strike prices may be displayed on the coordinate corresponding to the first position 10 of the first axis, for instance, the X-axis. For instance, a bar chart 2 at the lowermost end of FIG. 3 shows information on a first call option product of which the strike price is a specified price, for instance, 312.50, and a bar chart 2-1 at the middle of the bar chart 2 shows information on a second call option product of which the strike price is the second low price, for instance, 310.50. Furthermore, a bar chart 2-2 displayed at the top of the bar chart 2-1 may show information on a third call option product of which the strike price is the third low price, for instance, 307.50.

As known, the bar charts 2, 2-1 and 2-2 or 3, 3-1 and 3-2 may be charts which are easy to intuitively display a current price, a high price, and a low price. For instance, the bar chart 2 displays an interface showing a current price 11, a low price 13, and a high price 14 in a predetermined way. Moreover, according to exemplary embodiments of the invention, the bar chart 2 may further display an interface to show an opening price 12. Although not shown in FIG. 3, prices near to the interfaces 11, 12, 13 and 14, namely, actual prices of the current price 11, the low price 13, the high price 14, and/or the opening price 12 may be displayed.

Additionally, information on the strike prices of the bar charts may be displayed at predetermined positions related with the bar charts, for instance, next to indication lines of the current price 11, the low price 13, the high price 14 and/or the opening price 12 in order to inform the user of the strike prices of the bar charts. In addition, the user can intuitively see through such a indication of strike prices whether or not prices of two option products existing at the opposite positions are changed and the prices of two option products with the same strike price are crossed each other. So, the price of the two option products may be supported or resisted at the crossing point.

In the same way, the bar chart, for instance, 2-1 may display a current price 11-1, an opening price 12-1, a low price 13-1, and a high price 14-1 of the second call option product, for instance, having the strike price of 310.00.

As shown in the drawing, information on the put option products with different strike prices may be displayed on the coordinate corresponding to the second position 20 of the first axis, for instance, the X-axis. For instance, the bar chart 3 of the lowermost end of FIG. 3 shows information on the first put option product of which the strike price is a specified price, for instance, 307.50, and the bar chart 3-3 shown at the top of the bar chart 3 shows information on the second put option product of which the strike price is the second high price, for instance, 310.00. In this instance, the second put option product may not correspond to the call option products. The reason is that the number of the call option products existing within a predetermined price range is smaller than the number of the put option products.

The bar chart 3-1 shown at the middle of the bar chart 3 may be information on the third put option products of which the strike price is the third high price, for instance, 312.50. Moreover, the bar chart 3-2 shown at the top of the bar chart 3 may be information on the put option products of which the fourth high price, for instance, 315.00.

Additionally, current prices 21 and 21-1, opening prices 22 and 22-1, low prices 23 and 23-1, and high prices 24 and 24-1 of the bar charts 3 and 3-1 may be displayed.

The electronic option chart 1 allows the user to intuitively grasp the information of option products at the opposite positions with similar prices (premiums). For instance, the specified price, for instance, the opening price, of the first call option product, for instance, having the strike price of 312.50, may be similar to the specified price, for instance, the opening price, of the first put option product, for instance, having the strike price of 307.50, and in this instance, the first call option product, for instance, the having strike price of 312.50, and the first put option product, for instance, having the strike price of 307.50, may be displayed at similar positions of the second axis, for instance, the Y-axis.

In addition, to display at the similar position of the second axis, for instance, the Y-axis means to have a similar expectation value (premium) or a similar expectation level at the opposite positions in the market, and it means it is highly possible that the first call option product, for instance, having the strike price of 312.50 and the first put option product, for instance, having the strike price of 307.50, may have an influence on each other in price.

As described above, the option products at the different positions which are expected to have an influence on each other in price are defined as corresponding option products.

As described above, the first call option product, for instance, having the strike price of 312.50 and the first put option product, for instance, having the strike price of 307.50, may be the corresponding option products.

The corresponding option products may be defined as follows.

For instance, two products with the most similar predetermined prices may be determined as the corresponding option products. In this instance, an option product which will be a criterion to determine the first corresponding option products is needed. In FIG. 3, the call option product located at the lowermost end of the electronic option chart 1 is the criterion.

It is necessary to decide the call option products to be displayed on the electronic option chart 1. According to exemplary embodiments of the invention, option products having prices (premiums) within a predetermined range may be displayed on the electronic option chart 1.

Moreover, the predetermined price range may be set within a scope that trading is the most active or that users prefer the most, and is changeable as occasion demands. For instance, the predetermined range may have a price, for instance, an opening price, between a predetermined lowest price and a predetermined highest price. Alternatively, the predetermined range may be set to have a price, for instance, an opening price, less than a predetermined highest price.

As described above, when the predetermined range is set, the call option products and the put option products that the specified price, for instance, the opening price, is within the predetermined range may be displayed on the electronic option chart 1.

Then, based on the first call option product (first put option product) at the lowermost end among the displayed call option products (put option products) as the criterion product, the first put option product (the first call option product) at the opposite position with the most similar specified price, for instance, the opening price, may be determined as the corresponding option product.

After that, the corresponding option product of the second call option product (second put option product) superjacent to the first call option product (first put option product), which is the criterion product, is determined, and then, the corresponding option product of the third call option product (third put option product) is determined, so that the corresponding option products of the option products can be determined respectively.

As described above, to determine the corresponding option product means to determine an option product at the opposite position which is expected to have the most influence on the price of the corresponding option product.

Therefore, it is a meaningful strategy to check changes in price of the corresponding option product of the specified option product, and the electronic option chart generating system can allow the users to easily and intuitively observe the corresponding option product and changes in price of the corresponding option product.

That is, exemplary embodiments of the invention can allow the users to intuitively grasp movement of a counterpart price (put option or call option) of the criterion price (call option or put option) among near ATM (At The money) prices and a price to check.

The opening price among the prices is used in order to determine the corresponding option product because the opening price is more suitable for showing a market movement on current day than the previous closing price.

Moreover, due to option characteristics to which a time value is reflected, even though the price of the call option increases more than the previous closing price, the price of put option may not drop as much as an increase rate of the call option. Additionally, even though the price of the call option decreases more than the previous closing price, the price of put option may not increase as much as a decrease rate of the call option.

Therefore, if the user judges the option price to which the time value is reflected by the increase rate or the decrease rate of the previous closing price, it causes a problem that the user judges the option price while looking at the fluctuation range of warped price, namely, with decreased time-value premium.

Therefore, in order to reflect relatively exact increase and decrease, it is necessary to use not the previous closing price but the current opening price for carrying out dealing to be more accessible to the market movement of current day.

If the market starts, the control module 110 can determine the corresponding option product using the opening prices of the option products having a plurality of strike prices.

As described above, the electronic option chart 1 may be created with respect to option products having the opening prices within a predetermined price range.

In this instance, the number of the option products within the predetermined price range, namely, the number of option products having different strike prices, may be different between the call option products and the put option products. In this instance, the option product at the position where the number is smaller may be the criterion product.

For instance, there may be four call option products of different strike prices having the opening prices within the predetermined price range, and there may be five put option products of different strike prices having the opening prices within the predetermined price range. In this instance, the control module 110 determines the corresponding option product based on the criterion product at the lowermost end of the call option products, and in consecutive order, determines the corresponding option products of the call option products displayed at the top of the criterion product.

Of course, there may be five call option products having the opening prices within the predetermined price range, and there may be four put option products having the opening prices within the predetermined price range. In this instance, the product at the lowermost end of the put option products may be the criterion product.

Moreover, if the number of the call option products having the opening prices within the predetermined price range is different from the number of the put option products having the opening prices within the predetermined price range, as shown in FIG. 3, any one of the option products may not have the corresponding option product.

When the corresponding option products of the option products are determined in the above way, the control module 110 connects the corresponding option products with each other so that the user can easily grasp whether or not the call option products and the put option products correspond to each other.

Lines or other marks which connect the corresponding option products with each other may be defined as connection information.

Of course, the corresponding option products may be reset when the current prices of the option products are changed. That is, the first call option product and the first put option price are the corresponding option products based on the opening price at the time of opening of the market, but products of the opposite positions with the most similar current prices may be the corresponding option products during the middle of the market. In this instance, of course, the connection information may be reset.

Such connection information may be expressed in any method if it can express the corresponding option products.

For instance, the corresponding option products may be displayed with the same color. In this instance, two option products with the same color at the opposite positions may be the connection information. Alternatively, the corresponding option products may be connected with each other by a line.

Those skilled in the art may easily deduce that the corresponding option products may be expressed in other various ways and the connection information may be expressed in various examples.

For example, the corresponding option products may be connected with each other by a line expressing the current prices thereof. That is, the line that connects the current prices of the corresponding option products may be the connection information.

For instance, as shown in FIG. 3, a connection line 30 that connects the current prices 11 and 21 included in the bar charts 2 and 3 of the corresponding option products may be the connection information. Furthermore, a connection line 31 which connects the current prices 11-1 and 21-1 included in the bar charts 2-1 and 3-1 of other corresponding option products may be the connection information.

As described above, if the connection line that connects the current prices is used as the connection information, it not only provides information that the two option products are the corresponding option products but also allows the users to intuitively grasp a change in the current price by a change in a slope or a shape of the line.

In the meantime, according to the principles of the invention, a triangle chart may be helpful to decide trading of option products using the corresponding option products. Referring to FIG. 4, the triangle chart will be described.

FIG. 4 is a diagram of an exemplary embodiment of a triangle chart constructed according to the principles of the invention.

For convenience of description, FIG. 4 illustrates two call option products and two put option products which are corresponding option products to each other.

As described above, the control module 110 may indicate current-call-put connection lines 30 and 31, which connect the current prices of the corresponding option products, as the connection information.

The control module 110 may further indicate opening middle points 40 and 41 which are middle points of the connection lines that connect the opening prices of the corresponding option products.

Then, the triangle chart having the opening-middle-current connection lines 50, 51 and 50-1, 51-1 which connect the current prices of the corresponding option products and the opening middle points 40 and 41—and the current-call-put connection lines 30 and 31 may be displayed on the electronic option chart as shown in FIG. 4.

The shape and/or the area of the triangle chart may be meaningful information. For instance, the shape of the triangle chart may show the level of a relative change in prices of the corresponding option products, and the area of the triangle chart may be information showing the level of the power of the trend.

Alternatively, the electronic option chart generating system according to exemplary embodiments of the invention may collect information on various shapes of the triangle, for instance, a triangle, an inverted triangle, a nearly right-angled triangle or the like and on actual changes in prices of the option products, and then, mine information on the shapes or areas of the triangles.

The triangle chart may be used as meaningful information in various ways.

As described above, the triangle chart can be meaningful information because it ideal that if the price of any one among the two corresponding option products at the opposite positions drops to a predetermined level, the price of the corresponding option product which is at the opposite position increases to the predetermined level.

In this instance, it is ideal that the current-call-put connection lines 30 and 31 that connect the current prices of the corresponding option products is a line changing the slope of the opening price connection line. That is, the current-call-put connection lines 30 and 31 ideally pass the market middle points 40 and 41, and in this instance, the triangle chart is not created.

However, creation of the triangle chart may mean that the price of any one among the two corresponding option products has an unideal change. For instance, it may mean that a change in price of any one among the corresponding option products is relatively smaller than that of the option product at the opposite position. Additionally, that the area of the triangle chart large means that imbalance of the price change is relatively larger.

Therefore, if the shape and/or the area of the triangle chart are used as meaningful information, the user can decide a highly beneficial trading or predict a price change.

For example, a user may predict that premiums of the call option product and the put option product will decrease at the same time if there is a triangular chart, and in this instance, the user may be on selling both of the call option and the put option or standby for trading.

Furthermore, a user may predict that the price (premium) of any one among the call option product and the put option product will move more powerfully if there is an inverted triangle chart, and in this instance, the user may buy both of the call option and the put option.

Additionally, a user may predict that the premium of any one among the call option product and the put option product will increase or decrease excessively if there is a triangle chart which is nearly right-angled, and in this instance, the user may make a strategy suitable for the case.

Of course, investors may interpret outcomes differently according to shapes and areas of the triangle chart and may make different strategies according to the interpretation. In addition, an automated algorithm, such as machine learning or data mining utilizing lots of data may be utilized to the interpretation of such a triangle chart.

In any case, a triangle chart constructed according to the principles of the invention may be utilized as providing meaningful information for the option products.

Methods for generating an electronic option chart according to the principles and exemplary embodiments of the invention may be embodied by computer-readable codes stored in a computer-readable recording media. The recording media includes recording devices of all kinds in which computer-readable data is stored. For the computer-readable recording media, there are ROMs, RAMs, CD-ROMs, magnetic tapes, hard discs, floppy discs, optical data storage devices, and so on. Moreover, the computer-readable recording media is dispersed to a computer system connected through a network so that computer-readable codes are stored and executed in a dispersion way. Furthermore, functional programs, codes and code segments for embodying the present invention may be easily deduced by programmers in the art that the present invention belongs.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A system for generating an electronic option chart comprising:
   a communication interface to receive option information including information on a call option and a put option having a plurality of strike prices; and
   a data processing controller to generate the electronic option chart based on the received option information, to set a predetermined first position of a first axis as a position of a call option and a predetermined second position of the first axis as position of a put option, to set a second axis as an axis representing a price, to generate signals to display call option charts indicating price information of a plurality of call option products having different strike prices at the first position of the first axis, and to display put option charts indicating price information of a plurality of put option products having different strike prices at the second position of the first axis, wherein:
   the call option charts are arranged along a direction of the second axis representing the price at the first position of the first axis, and
   the put option charts are arranged along the direction of the second axis representing the price at the second position of the first axis.

2. The system according to claim 1, wherein the data processing controller is configured to determine at least one second position option product, each of which has an opposite position and closest opening price to at least one first position option product, as a corresponding option product corresponding to the at least one first position option product of a plurality of a first position option products which are one of the call option products or the put option products.

3. The system according to claim 2, wherein the data processing controller is configured to generate predetermined connection information for display between the determined corresponding option products.

4. The system according to claim 3, wherein the connection information comprises a current-call-put connection line to connect current prices of the corresponding option products with each other.

5. The system according to claim 4, wherein the data processing controller is configured to generate signals to display a triangle chart having plural opening-middle-current connection lines each of which connects each current price of the corresponding option products and an opening middle point which is a middle point of the connection line that connects the opening price of the corresponding option products, and the current-call-put connection line.

6. The system according to claim 2, wherein the data processing controller is configured to indicate some first position option products, each of which has a specified price within a predetermined price range, on the electronic option chart.

7. The system according to claim 6, wherein the data processing controller is configured to determine the corresponding option product based on a criterion option product, which is one of the call option products or the put option products, a number of which with strike price within the predetermined price range is smaller.

8. The system according to claim 1, wherein the price information comprises information on current price, opening price, high price and low price of the option products.

9. The system according to claim 1, wherein:
   the call option charts are spaced apart from each other and overlap each other in the direction of the second axis, and
   the put option charts are spaced apart from each other and overlap each other in the direction of the second axis.

10. A method for generating an electronic option chart comprising the steps of:
    receiving option information including information on a call option and a put option having a plurality of strike prices; and
    generating an electronic option chart based on the received option information by setting a first position of a first axis as a call option position and a second position of the first axis as a put option position and setting a second axis as an axis to prices, and generating signals to display call option charts indicating price information of a plurality of call option products having different strike prices at the first position of the first axis, and generating signals to display put option charts indicating price information of a plurality of put option products having different strike prices at the second position of the first axis, wherein:
    the call option charts are arranged along a direction of the second axis representing the price at the first position of the first axis, and
    the put option charts are arranged along the direction of the second axis representing the price at the second position of the first axis.

11. The method according to claim 10, wherein the step of generating an electronic option chart based on the received option information further comprises the steps of determining at least one second position option product, each of which has opposite position and closest opening price to at least one first position option product, as a corresponding option product corresponding to the at least one first position option product of a plurality of a first position option products which are one of the call option products or the put option products.

12. The method according to claim 11, wherein the step of generating an electronic option chart based on the received option information further comprises the steps of generating signals to display predetermined connection information between the determined corresponding option products.

13. The method according to claim 12, wherein the connection information comprises a current-call-put connection line that connects current prices of the corresponding option products with each other, and wherein the step of generating an electronic option chart based on the received option information further comprises the steps of generating signals to display a triangle chart having plural opening-middle-current connection lines each of which connects each current price of the corresponding option products and an opening middle point which is a middle point of the connection line that connects the opening price of the corresponding option products, and the current-call-put connection line.

14. A computer program stored in a non-transitory recording media configured to be installed in a data processor to carry out the method described in claim 13.

15. A computer program stored in a non-transitory recording media configured to be installed in a data processor to carry out the method described in claim 10.

* * * * *